US010690346B2

United States Patent
Propheter-Hinckley et al.

(10) Patent No.: US 10,690,346 B2
(45) Date of Patent: Jun. 23, 2020

(54) WASHER FOR COMBUSTOR ASSEMBLY (71) Applicant: United Technologies Corporation, Farmington, CT (US)

(72) Inventors: Tracy A. Propheter-Hinckley, Manchester, CT (US); Mark F. Zelesky, Bolton, CT (US); Atul Kohli, Tolland, CT (US); Dustin W. Davis, Marlborough, CT (US); Ricardo Trindade, Mansfield, CT (US); Steven Bruce Gautschi, Milton, MA (US); Brandon W. Spangler, Vernon, CT (US); Trevor Rudy, Morgantown, WV (US); Benjamin Bellows, Glastonbury, CT (US); Dave J. Hyland, Portland, CT (US); James B. Hoke, Tolland, CT (US); Stephen K. Kramer, Cromwell, CT (US); Dennis M. Moura, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 408 days.

(21) Appl. No.: 15/476,431

(22) Filed: Mar. 31, 2017

(65) Prior Publication Data
US 2018/0283687 A1 Oct. 4, 2018

(51) Int. Cl.
*F23R 3/00* (2006.01)
*F23R 3/60* (2006.01)
(Continued)

(52) U.S. Cl.
CPC ............... *F23R 3/002* (2013.01); *F23R 3/06* (2013.01); *F23R 3/60* (2013.01); *F16B 43/00* (2013.01);
(Continued)

(58) Field of Classification Search
None
See application file for complete search history.

(56) References Cited

U.S. PATENT DOCUMENTS

| 5,628,587 A | 5/1997 | Lesslie |
| 5,707,192 A * | 1/1998 | Vortriede .............. F16B 37/041 411/175 |

(Continued)

FOREIGN PATENT DOCUMENTS

| EP | 2743585 A1 | 6/2014 |
| EP | 3196553 A1 | 7/2017 |

OTHER PUBLICATIONS

European Search Report from the European Patent Office for EP Application No. 18165053.2 dated Aug. 23, 2018, 10 pages.

*Primary Examiner* — Todd E Manahan
*Assistant Examiner* — Rodolphe Andre Chabreyrie
(74) *Attorney, Agent, or Firm* — Cantor Colburn LLP (57) ABSTRACT

A combustor for a gas turbine engine includes a combustor shell having a shell opening therethrough, a combustor panel having a stud attached thereto, the stud extending through the shell opening. The stud includes a standoff to define an intermediate passage between the combustor shell and the combustor panel. A retainer is attached to the stud. A washer surrounds the stud and is positioned between the retainer and the combustor shell. The washer at least partially defines a cooling flow passage configured to direct a cooling airflow through the shell opening to impinge the cooling flow on at least one of the stud or the standoff.

5 Claims, 10 Drawing Sheets (51) Int. Cl.
*F23R 3/06* (2006.01)
*F16B 43/00* (2006.01)

(52) U.S. Cl.
CPC ... *F23R 2900/03044* (2013.01); *Y02T 50/675* (2013.01)

(56) References Cited

U.S. PATENT DOCUMENTS

| | | |
|---|---|---|
| 8,833,084 B2 | 9/2014 | Carlisle |
| 8,800,298 B2 | 10/2014 | Ladd et al. |
| 9,422,830 B2 | 8/2016 | Gerendas et al. |
| 9,518,737 B2 | 12/2016 | Pidcock et al. |
| 2010/0263386 A1 | 10/2010 | Edwards et al. |
| 2011/0011095 A1 | 1/2011 | Ladd et al. |
| 2014/0190166 A1* | 7/2014 | Pidcock ............ F23R 3/002 60/722 |
| 2015/0167728 A1* | 6/2015 | Bizzini ............ F16B 37/0842 411/517 |
| 2015/0176434 A1 | 6/2015 | Gerendas et al. |
| 2016/0208704 A1 | 7/2016 | Bouldin et al. |
| 2016/0290167 A1 | 10/2016 | Porter et al. |

* cited by examiner

WASHER FOR COMBUSTOR ASSEMBLY

BACKGROUND

Exemplary embodiments pertain to the art of gas turbine engines. More particularly, the present disclosure relates to combustor assemblies of gas turbine engines, and cooling structures thereof.

Gas turbine engine combustors are subject to high thermal loads for prolonged periods of time. To alleviate the accompanying thermal stresses, the walls of the combustors are typically cooled to extend the usable service life of the combustor components and therefore improve reliability of the gas turbine engine.

An annular combustor typically includes an outer combustor shell and a set of inner combustor panels secured to the combustor shell to thermally protect the combustor shell from hot combustion gases. The combustor panels are typically secured to the combustor shell by a plurality of mechanical fastener arrangements. The mechanical fastener arrangement often includes a stud that extends from the combustor panel through a stud opening in the combustor shell, and is secured at the combustor shell via a nut or similar component. Such arrangements subject the studs to high temperatures, reducing the service life of the combustor panels.

BRIEF DESCRIPTION

In one embodiment, a combustor for a gas turbine engine includes a combustor shell having a shell opening therethrough, a combustor panel having a stud attached thereto, the stud extending through the shell opening. The stud includes a standoff to define an intermediate passage between the combustor shell and the combustor panel. A retainer is attached to the stud. A washer surrounds the stud and is positioned between the retainer and the combustor shell. The washer at least partially defines a cooling flow passage configured to direct a cooling airflow through the shell opening to impinge the cooling flow on at least one of the stud or the standoff.

Additionally or alternatively, in this or other embodiments the washer includes a groove to define the cooling flow passage between the washer and the combustor shell and/or between the washer and the retainer.

Additionally or alternatively, in this or other embodiments the washer is wave-shaped around an outer perimeter of the washer.

Additionally or alternatively, in this or other embodiments the cooling flow passage extends from a passage inlet located at an outer perimeter of the washer to a passage outlet located at an inner perimeter of the washer.

Additionally or alternatively, in this or other embodiments the cooling flow passage tapers from the passage inlet to the passage outlet.

Additionally or alternatively, in this or other embodiments the washer includes a plurality of washer arms extending radially inwardly from an outer perimeter of the washer, the cooling flow passage defined between adjacent washer arms of the plurality of washer arms.

Additionally or alternatively, in this or other embodiments each washer arm includes a web portion and a relatively circumferentially wide end portion located radially inboard of the web portion.

Additionally or alternatively, in this or other embodiments adjacent washer arms do not contact each other.

Additionally or alternatively, in this or other embodiments the washer includes a washer sleeve extending through the shell opening, the cooling flow passage at least partially defined by the washer sleeve.

Additionally or alternatively, in this or other embodiments the cooling flow passage includes a passage inlet located at an outer perimeter of the washer, and a passage outlet located at an axial end of the washer sleeve.

Additionally or alternatively, in this or other embodiments the washer includes a plurality of ribs to define the passage inlet between the washer and the combustor shell.

In another embodiment, a washer for a combustor of a gas turbine engine includes a first washer surface, a second washer surface opposite the first washer surface, an outer perimeter surface extending between the first washer surface and the second washer surface, and a cooling flow passage to direct a cooling airflow therethrough.

Additionally or alternatively, in this or other embodiments a groove is located at one of the first washer surface or the second washer surface to at least partially define the cooling flow passage.

Additionally or alternatively, in this or other embodiments the cooling flow passage extends from a passage inlet located at the outer perimeter surface to a passage outlet located at an inner perimeter of the washer.

Additionally or alternatively, in this or other embodiments a plurality of washer arms extend radially inwardly from the outer perimeter surface of the washer, the cooling flow passage defined between adjacent washer arms of the plurality of washer arms.

Additionally or alternatively, in this or other embodiments a washer sleeve extends from the first surface, the cooling flow passage at least partially defined by the washer sleeve.

In yet another embodiment, a gas turbine engine includes a turbine section, and a combustor configured to combust fuel and direct combustion products to the turbine section. The combustor includes a combustor shell having a shell opening therethrough, a combustor panel having a stud attached thereto, the stud extending through the shell opening, the stud including a standoff to define an intermediate passage between the combustor shell and the combustor panel, a retainer attached to the stud, and a washer surrounding the stud and positioned between the retainer and the combustor shell. The washer at least partially defines a cooling flow passage configured to direct a cooling airflow through the shell opening to impinge the cooling flow on at least one of the stud or the standoff.

Additionally or alternatively, in this or other embodiments the washer includes a groove to define the cooling flow passage between the washer and the combustor shell and/or between the washer and the retainer.

Additionally or alternatively, in this or other embodiments the cooling flow passage extends from a passage inlet located at an outer perimeter of the washer to a passage outlet located at an inner perimeter of the washer.

Additionally or alternatively, in this or other embodiments the washer includes a plurality of washer arms extending radially inwardly from an outer perimeter of the washer, the cooling flow passage defined between adjacent washer arms of the plurality of washer arms.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
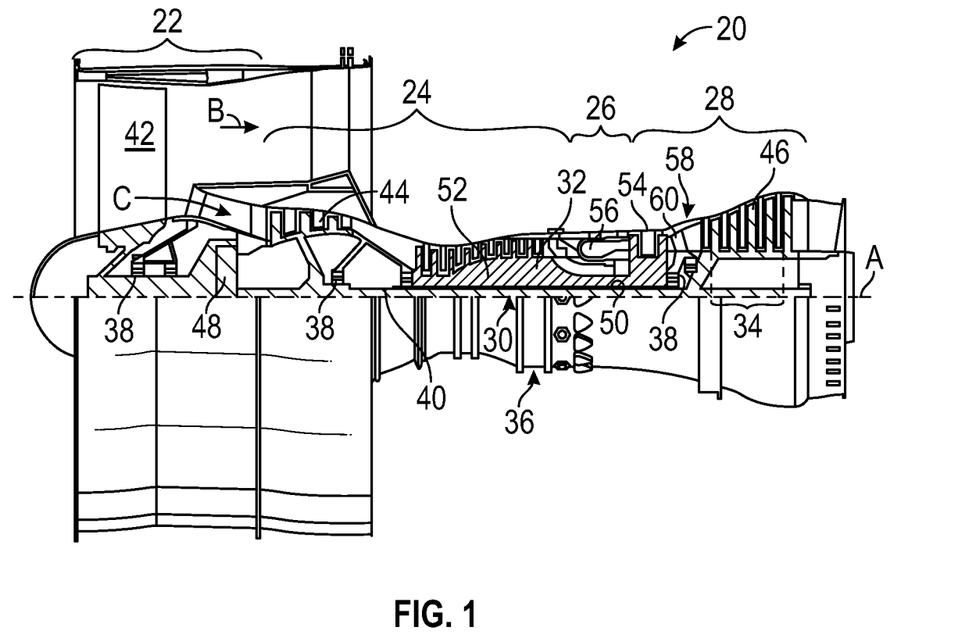
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
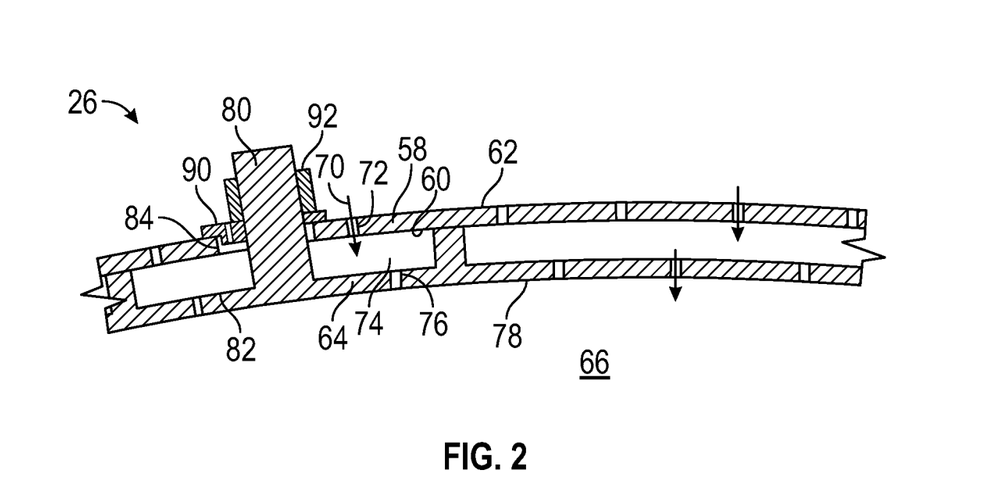
FIG. 2 is a partial cross-sectional view of an embodiment of a combustor for a gas-turbine engine.

Referring to FIG. 2, the combustor 26 includes a combustor shell 58 having an inboard side 60 and an outboard side 62. A plurality of combustor liner panels 64 are located at the inboard side 60 and are secured to the combustor shell 58 and define a combustion chamber 66. The combustor 26 includes one or more fuel nozzles (not shown), which in some embodiments extend into the combustion chamber 66. The combustor liner panels 64 are formed and configured to shield or protect the combustor shell 58, in particular the inboard side 60 from heat generated in the combustor chamber 66 by combustion of fuel from the fuel nozzle. During operation of the combustor 26, compressed cooling air is circulated at the outboard side 62 of the combustor shell 58 to provide cooling thereto. A portion of the cooling air, shown schematically at 70, passes through shell cooling openings 72 in the combustor shell 58 and into intermediate passage 74 between the combustor shell 58 and the combustor liner panels 64. Further, a portion of the cooling air 70 may pass through one or more panel openings 76 in the combustor liner panels 64 to cool an inboard liner surface 78 by, for example, film cooling.

Figure 3:
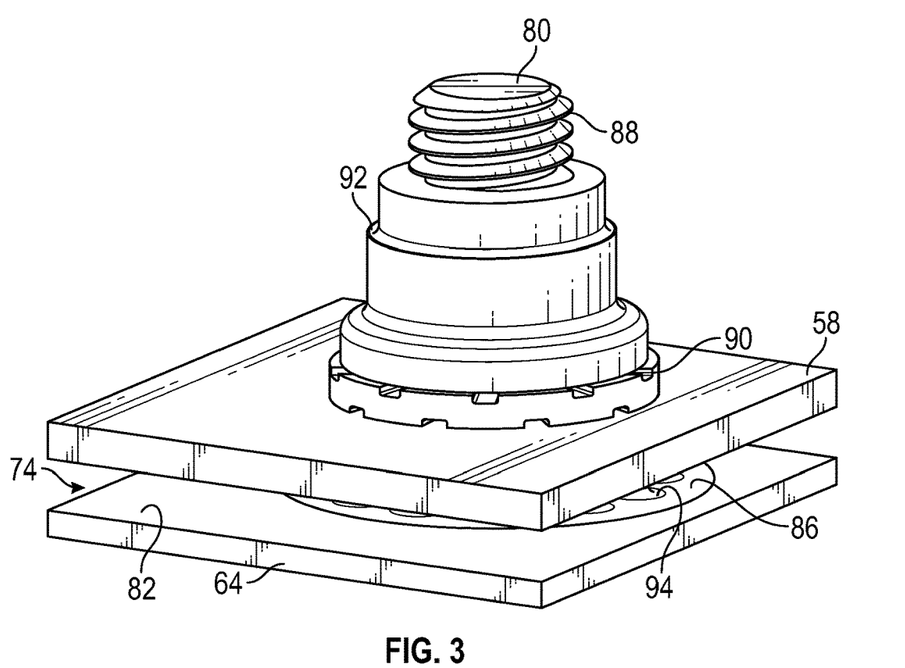
FIG. 3 is a perspective view of an embodiment of an attachment of a combustor liner panel to a combustor shell.

Now referring to FIG. 3, an attachment of a combustor liner panel 64 to the combustor shell 58 is illustrated. The combustor liner panel 64 includes at least one stud 80 extending from a back surface 82 of the combustor liner panel 64 across the intermediate passage 74 and through a shell stud opening 84 (shown in FIG. 2) in the combustor shell 58. The stud 80 includes a stud head 86 located at the combustor liner panel 64 with a stud shaft 88 extending therefrom. In some embodiments, the stud shaft 88 is threaded. A washer 90 is located over the stud shaft 88 and a nut 92 is installed to the stud shaft 88 to retain the combustor liner panel 64 to the combustor shell 58. To maintain spacing between the combustor shell 58 and the combustor liner panel 64 and define the intermediate passage 74, standoffs 94 (best shown in FIG. 4) are arranged around the stud shaft 88 and extend from the stud head 86 toward the combustor shell 58.

Figure 4:
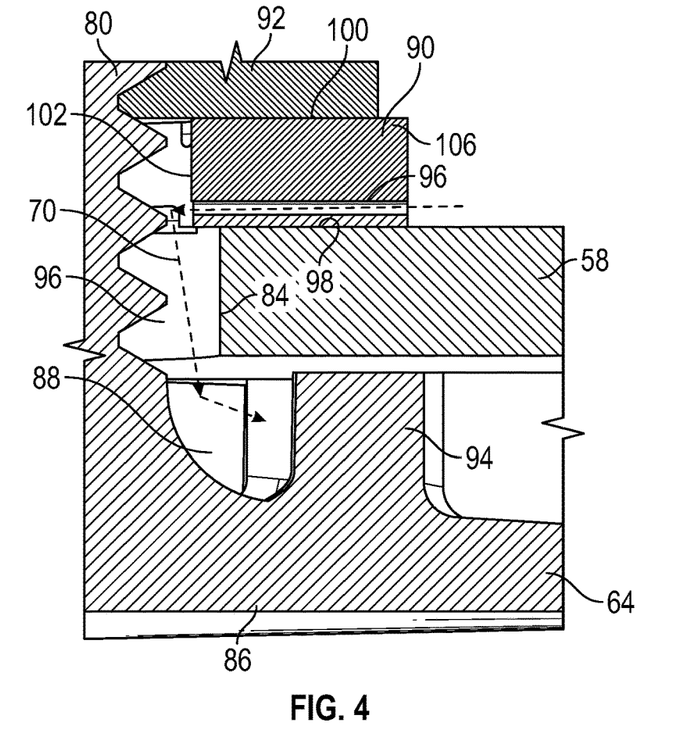
FIG. 4 is a partial cross-sectional view of an embodiment of an attachment of a combustor liner panel to a combustor shell.
Figure 5:
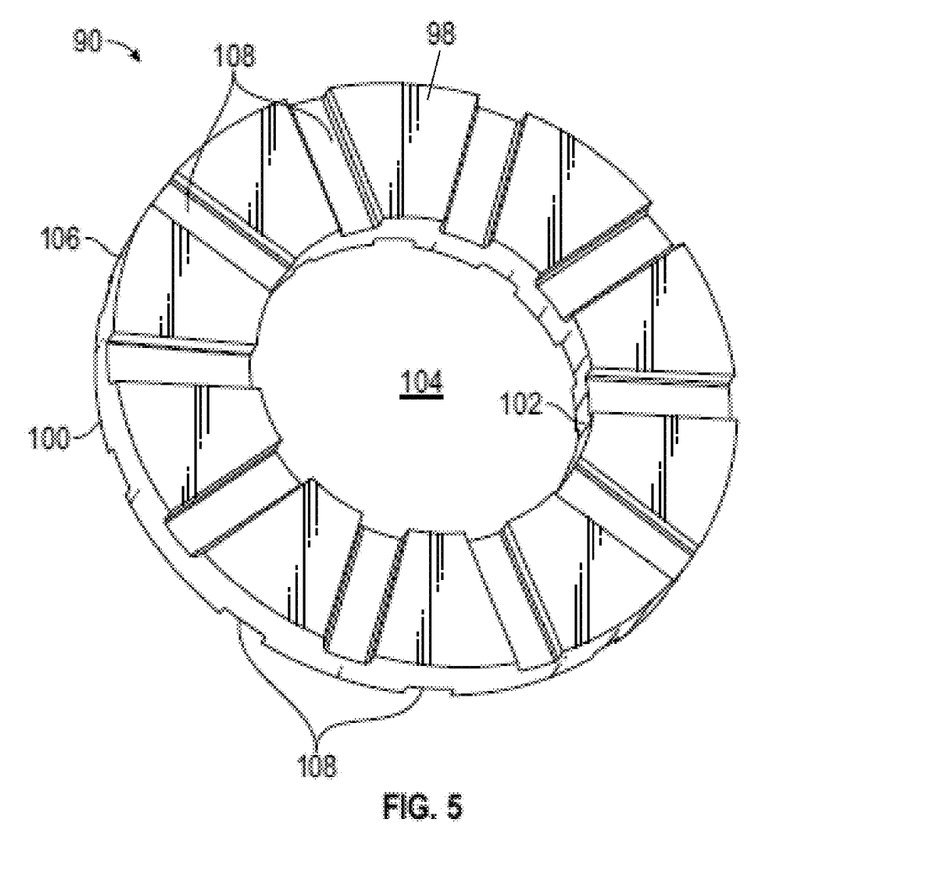
FIG. 5 is a perspective view of a washer for an attachment of a combustor liner panel to a combustor shell.
Figure 6:
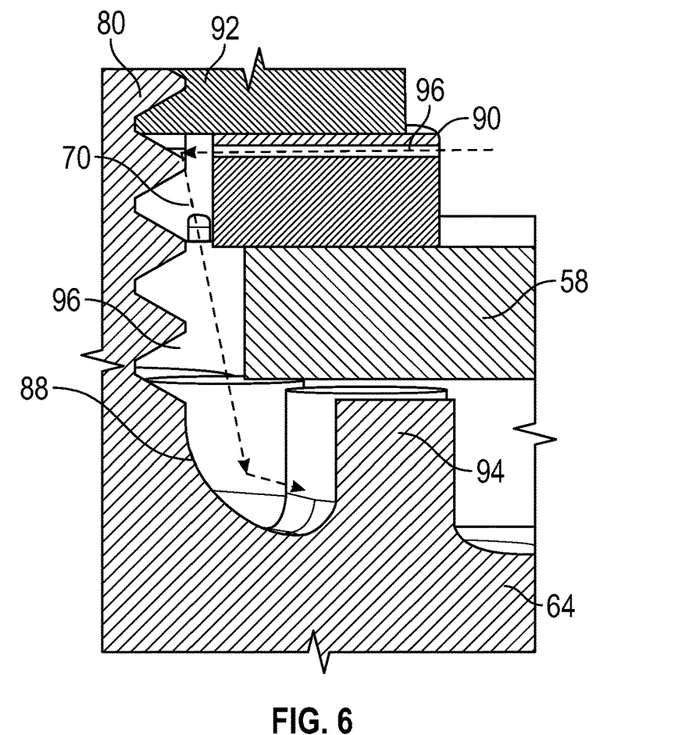
FIG. 6 is another partial cross-sectional view of an embodiment of an attachment of a combustor liner panel to a combustor shell.

As shown in FIG. 4, the washer 90, the stud 80 and the shell stud opening 84 define stud cooling passages 96 to allow cooling air 70 to pass therethrough and impinge on the stud shaft 88 and the standoffs 94 to reduce the temperatures of the stud shaft 88 and the standoffs 94, thereby extending their useful life. Referring to FIG. 5, the washer 90 has a first washer side 98 and a second washer side 100 opposite the first washer side 98 and is annular in shape, having an inner perimeter 102 defining a washer opening 104 and an outer perimeter 106. In the embodiment of FIG. 5, the washer 90 includes washer grooves 108 formed in the first washer side 98 and/or the second washer side 100, extending radially inwardly from the outer perimeter 106 to the inner perimeter 102. In some embodiments, the inner perimeter 102 and the outer perimeter 106 are circular. When the washer 90 and the nut 92 are installed to the stud 80, the washer grooves 108 define cooling passages 96 between the washer 90 and the combustor shell 58 as shown in FIG. 4, and cooling passages 96 between the washer 90 and the nut 92 as shown in FIG. 6. The cooling flow 70 flows through the cooling passages 96 and between the stud shaft 88 and the shell stud opening 84 to impinge on the stud 80 and the standoffs 94.

Figure 7:
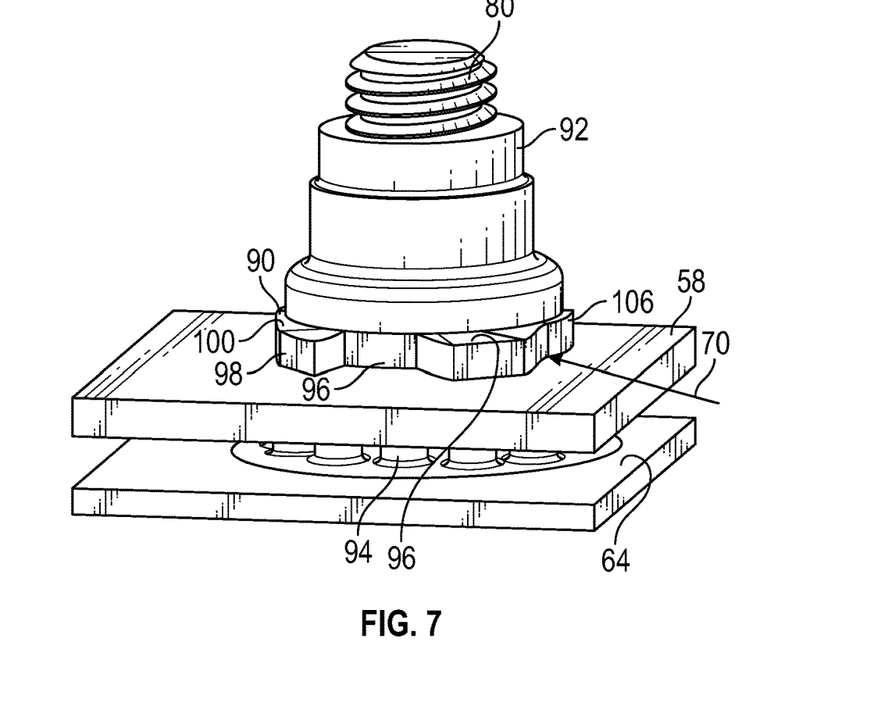
FIG. 7 is another perspective view of an embodiment of an attachment of a combustor liner panel to a combustor shell.
Figure 8:
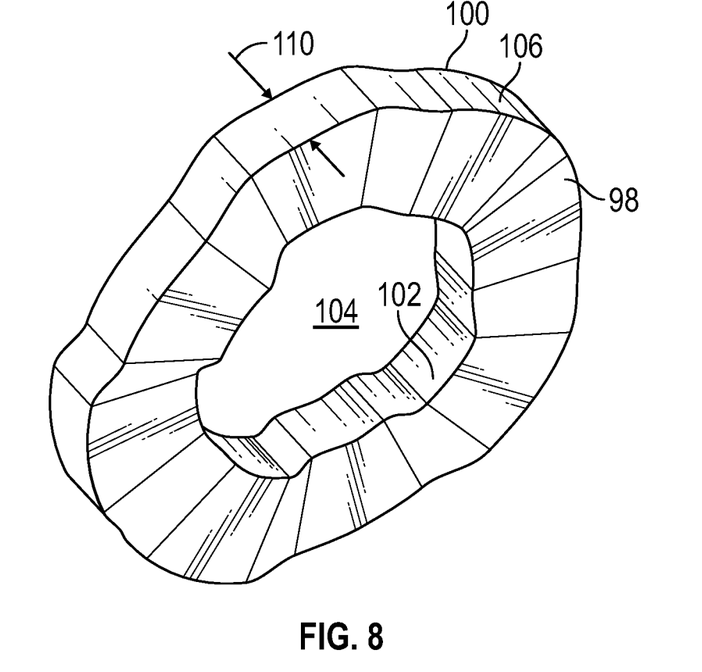
FIG. 8 is another perspective view of a washer for an attachment of a combustor liner panel to a combustor shell.

Referring now to FIGS. 7 and 8, the washer 90 may be formed as a "wavy washer" with the first washer side 98 and the second washer side 100 each having a wave shape, while maintaining a substantially constant washer thickness 110. When the washer 90 and the nut 92 are installed to the stud 80, cooling passages 96 are defined between the first washer side 98 and the combustor shell 58 and between the second washer side 100 and the nut 92 in an alternating pattern around the outer perimeter 106. The cooling flow 70 flows through the cooling passages 96 and between the stud shaft 88 and the shell stud opening 84 (both shown in FIG. 4) to impinge on the stud 80 and the standoffs 94.

Figure 9:
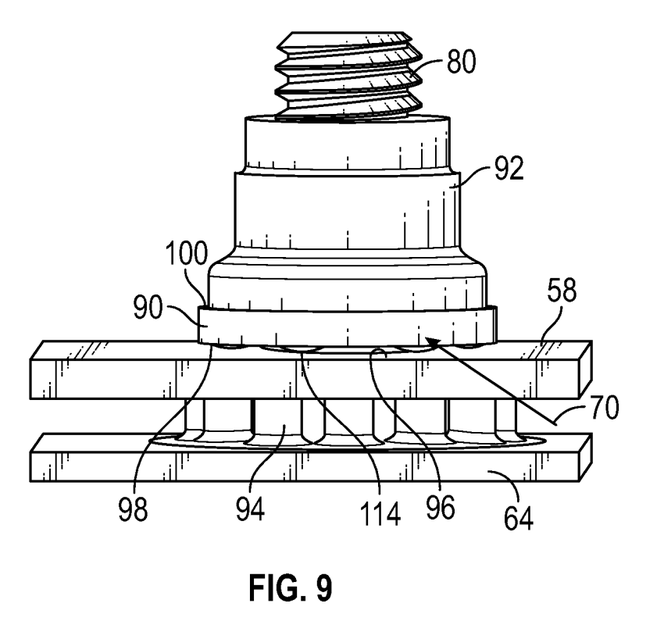
FIG. 9 is an elevation view of an embodiment of an attachment of a combustor liner panel to a combustor shell.
Figure 10:
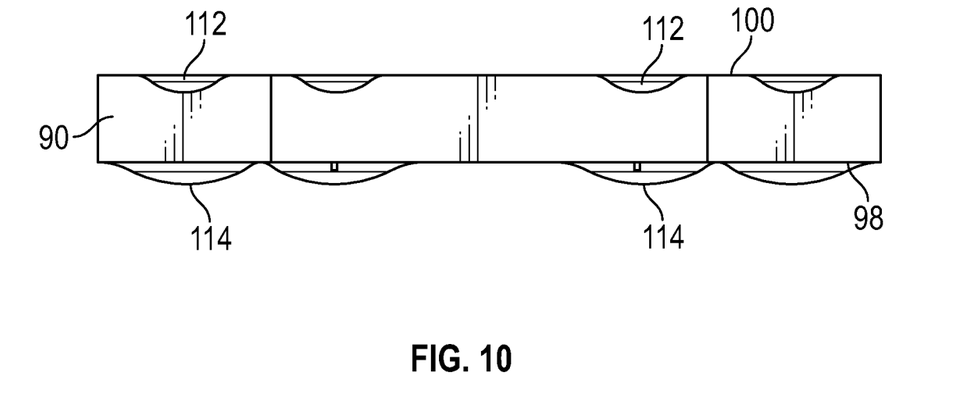
FIG. 10 is an elevation view of a washer for an attachment of a combustor liner panel to a combustor shell.

Referring now to FIGS. 9 and 10, in some embodiments the washer 90 includes a plurality of dimples formed therein, exhibited as a plurality of protrusions 114 in the first washer side 98 and corresponding recesses 112 at the second washer side 100. When the washer 90 and the nut 92 are installed to the stud 80, the protrusions 114 define the cooling passages 96 between the first washer side 98 and the combustor shell 58 around the outer perimeter 106. The cooling flow 70 flows through the cooling passages 96 and between the stud shaft 88 and the shell stud opening 84 (both shown in FIG. 4) to impinge on the stud 80 and the standoffs 94.

Figure 11:
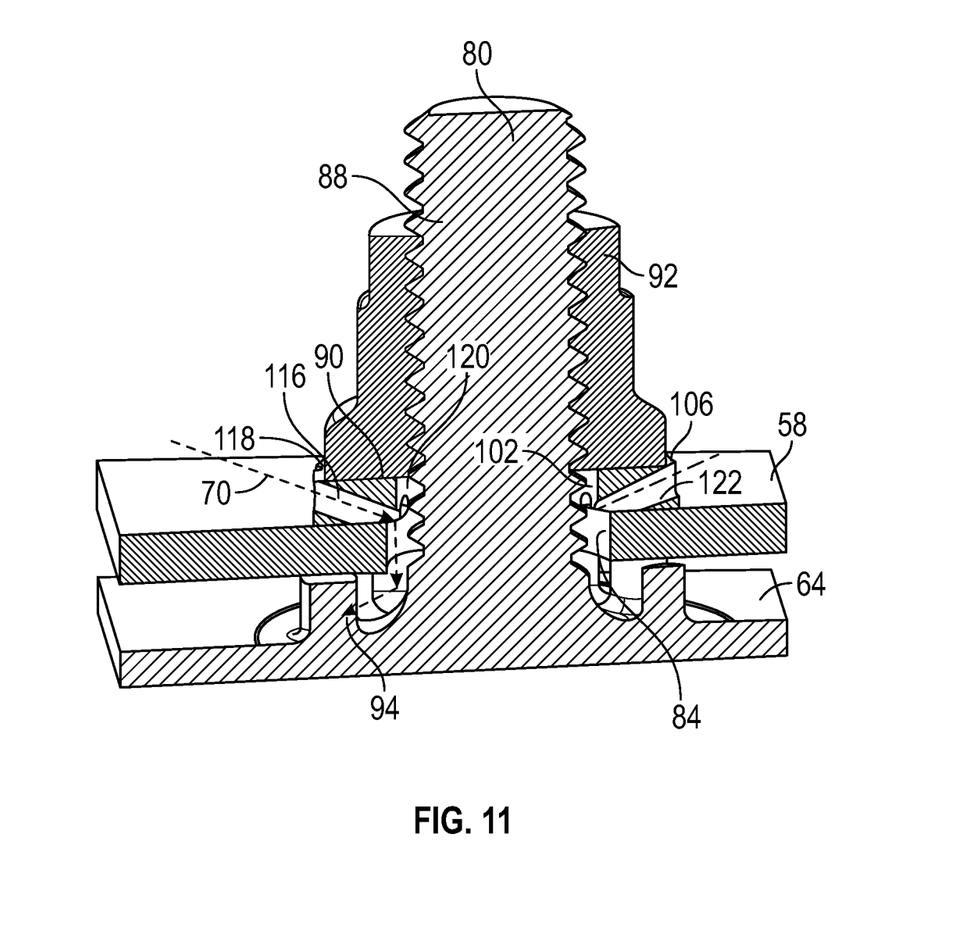
FIG. 11 is another cross-sectional view of an embodiment of an attachment of a combustor liner panel to a combustor shell.
Figure 12:
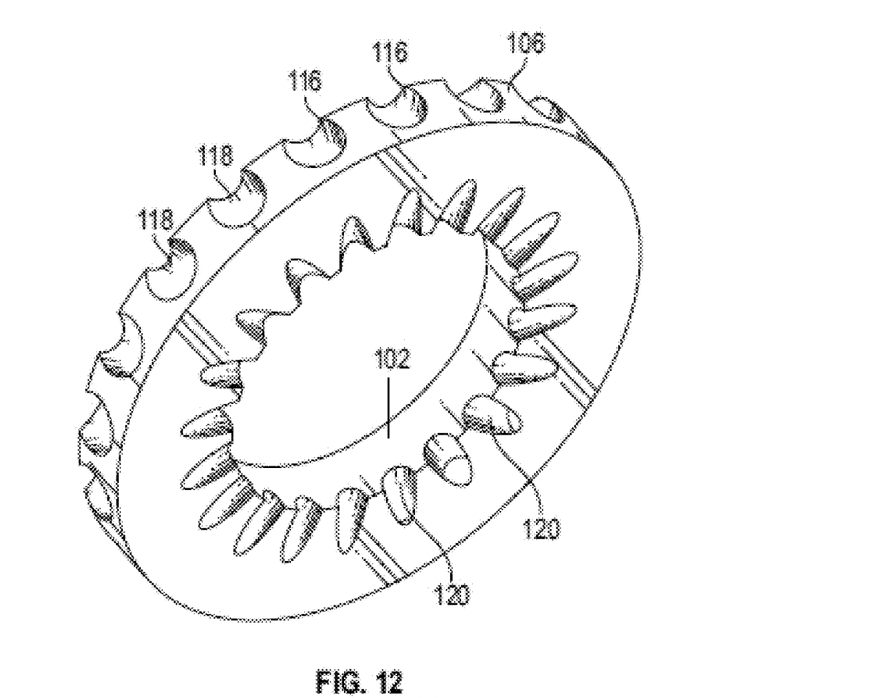
FIG. 12 is yet another perspective view of a washer for an attachment of a combustor liner panel to a combustor shell.

Referring now to FIGS. 11 and 12, in some embodiments the washer includes a plurality of through passages 116 extending from the outer perimeter 106 to the inner perimeter 102. Each through passage has a passage inlet 118 located at the outer perimeter 106, and a passage outlet 120 located at the inner perimeter 102. In some embodiments, a cross-sectional size of the through passage 116 decreases with distance from the passage inlet 118. Further, in some embodiments the through passage 116 extends along a passage central axis 122 non-perpendicular to the stud shaft 88. In some embodiments, the passage inlet 118 and/or the passage outlet 120 are circular in cross-section, but it is to be appreciated that other cross-sectional shapes such as oval or elliptical may be utilized. The cooling flow 70 flows through the through passages 116 and between the stud shaft 88 and the shell stud opening 84 to impinge on the stud 80 and the standoffs 94.

Figure 13:
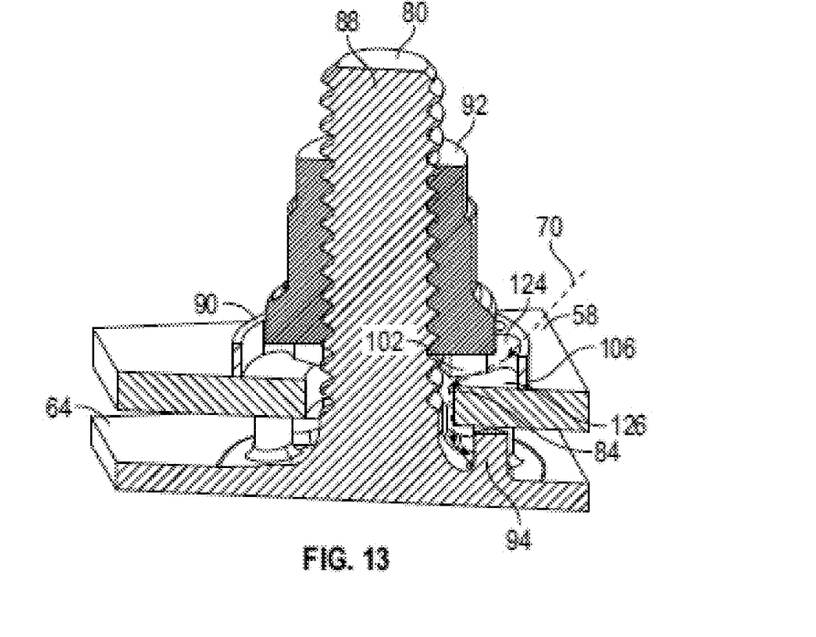
FIG. 13 is yet another cross-sectional view of an embodiment of an attachment of a combustor liner panel to a combustor shell.
Figure 14:
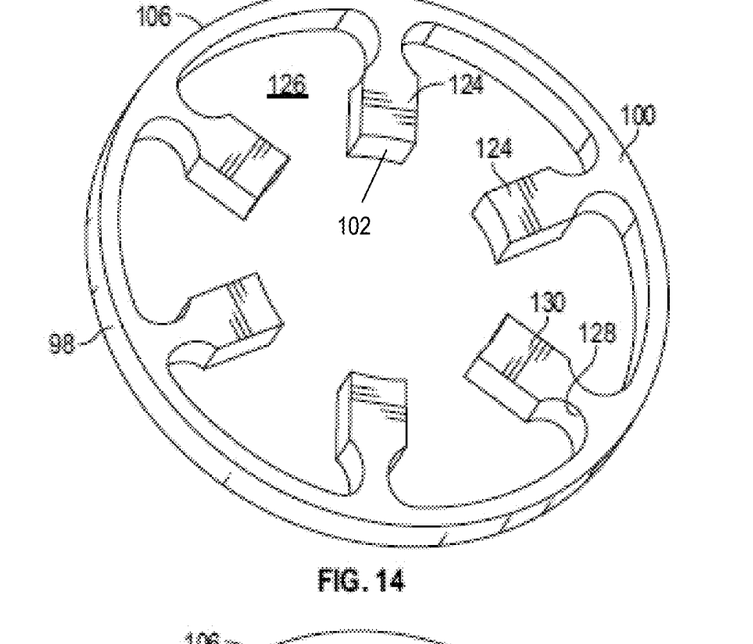
FIG. 14 is still another perspective view of a washer for an attachment of a combustor liner panel to a combustor shell.

Referring now to FIGS. 13 and 14, the washer 90 includes a continuous outer perimeter 106 and a plurality of washer arms 124 extending radially inwardly from the outer perimeter 106. Airflow passages 126 are defined between adjacent washer arms 124 and the washer arms 124 further define the inner perimeter 102 of the washer 90. In some embodiments, adjacent washer arms 124 do not contact each other. The airflow passages 126 extend through the washer 90 from the first washer side 98 to the second washer side 100 and allow the cooling flow 70 to flow through the airflow passages 126 and then between the stud shaft 88 and the shell stud opening 84 to impinge on the stud 80 and the standoffs 94.

Figure 15:
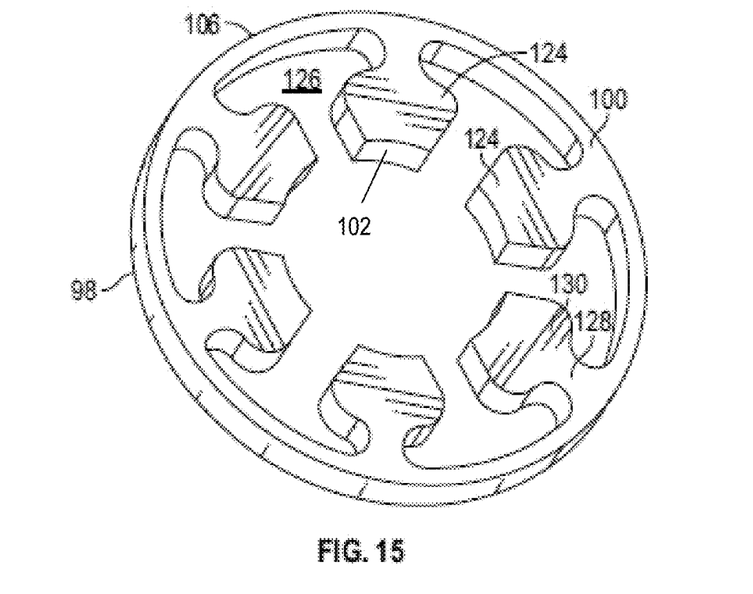
FIG. 15 is another perspective view of a washer for an attachment of a combustor liner panel to a combustor shell.

Referring to FIG. 14, in some embodiments, the washer arms 124 include a web portion 128 and a relatively circumferentially wide end portion 130 located radially inboard of the web portion 128. In some embodiments, the end portion 130 is substantially rectangular in an axial cross-section. It is to be appreciated, however, that the end portion 130 may be shapes other than rectangular such as a curvilinear shape as shown in FIG. 15, depending on cooling flow 70 requirements and other factors. Further, in other embodiments, the washer arms 124 may be a constant width along their radial extent. In the embodiments of FIGS. 14 and 15, six washer arms 124 are illustrated, while it is to be appreciated that other quantities of washer arms 124, such as 4, 5 or 8 washer arms 124, may be utilized in other embodiments.

Figure 16:
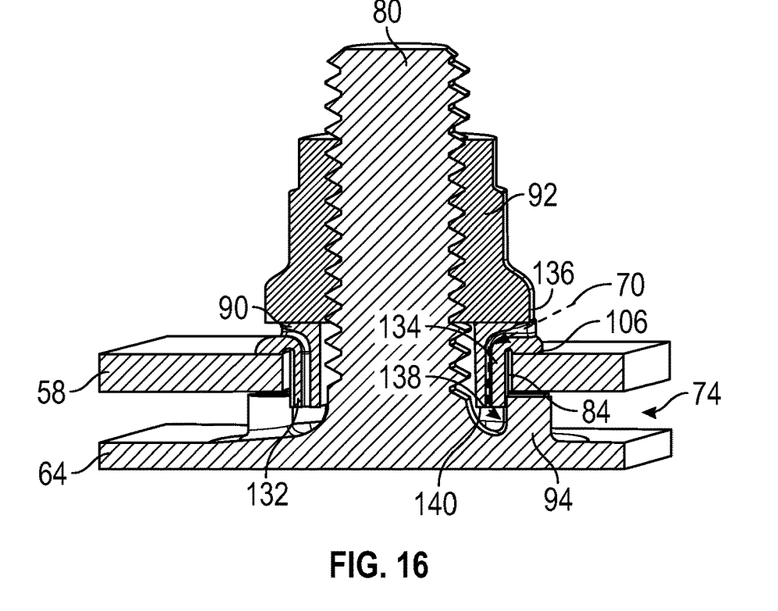
FIG. 16 is still another cross-sectional view of an embodiment of an attachment of a combustor liner panel to a combustor shell.

Referring now to FIG. 16, in some embodiments, the washer 90 includes a sleeve 132, in some embodiments formed integrally with the washer 90. The sleeve 132 extends in an axial direction and in some embodiments through the shell stud opening 84 and in some embodiments extends at least partially into the intermediate passage 74 as shown. The sleeve 132 includes one or more sleeve passages 134 extending from a passage inlet 136 at the outer perimeter 106 of the washer 90, to a passage outlet 138 at a sleeve end 140 of the sleeve 132. The sleeve passages 134 allow the cooling flow 70 to flow through the shell stud opening 84 and out of the passage outlets 138 to impinge on the stud 80 and the standoffs 94.

Figure 17:
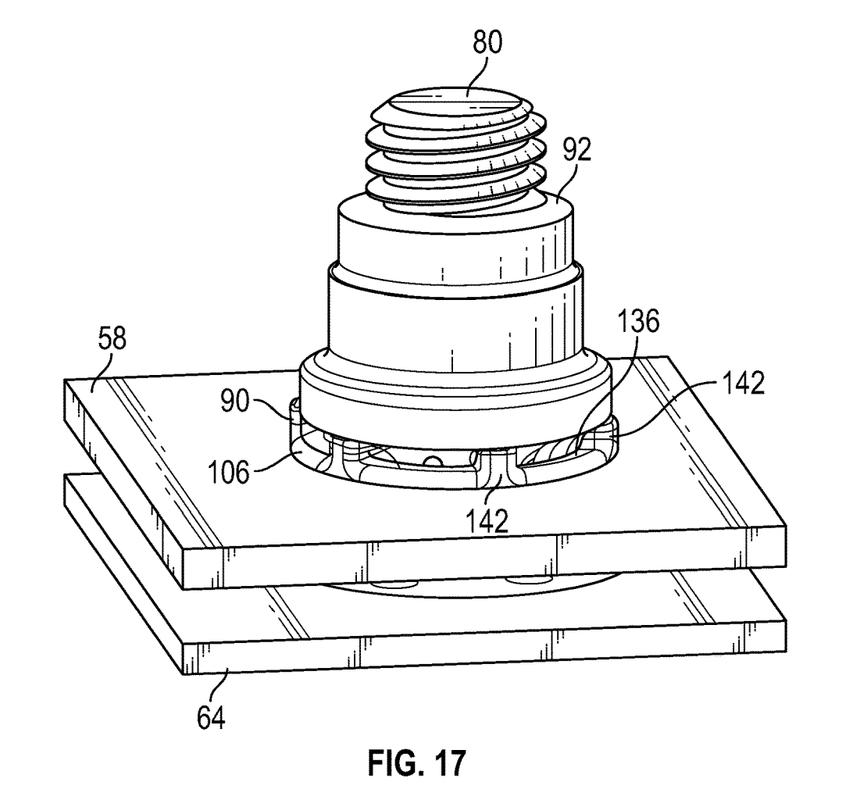
FIG. 17 is another perspective view of an embodiment of an attachment of a combustor liner panel to a combustor shell.
Figure 18:
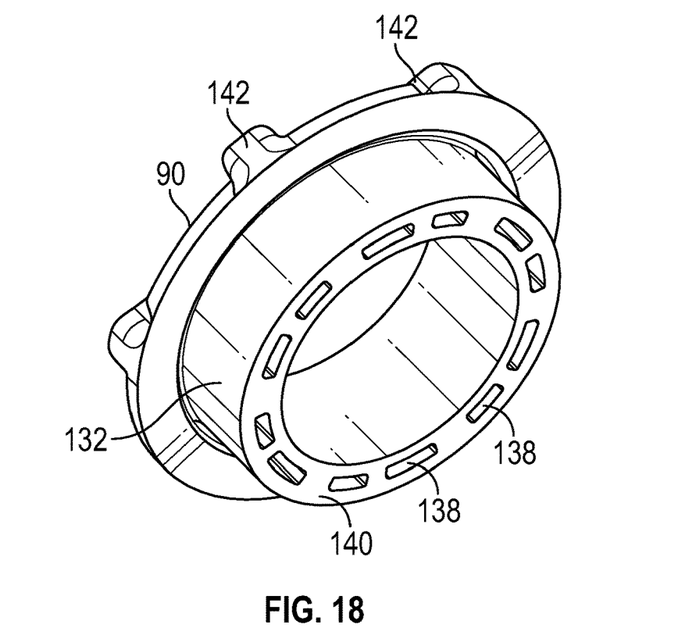
FIG. 18 is yet another perspective view of a washer for an attachment of a combustor liner panel to a combustor shell.

As shown in FIG. 17, the passage inlets 136 are defined between adjacent washer ribs 142 that define the outer perimeter 106 of the washer 90. In some embodiments, the washer 90 includes 6 washer ribs 142 and thus 5 passage inlets 136, while in other embodiments other quantities of washer ribs 142 and thus other quantities of passage inlets 136 may be utilized. Referring now to FIG. 18, the passage outlets 138 in the sleeve end 140 of the sleeve 132 may have an oval, elliptical, rectangular or other polygonal and/or curvilinear shape. In the embodiment illustrated, 12 passage outlets 138 are shown, but one skilled in the art will readily appreciate that other quantities of passage outlets 138, such as 1, 6, 8, or 10 or more passage outlets 138 may be utilized.

Figure 19:
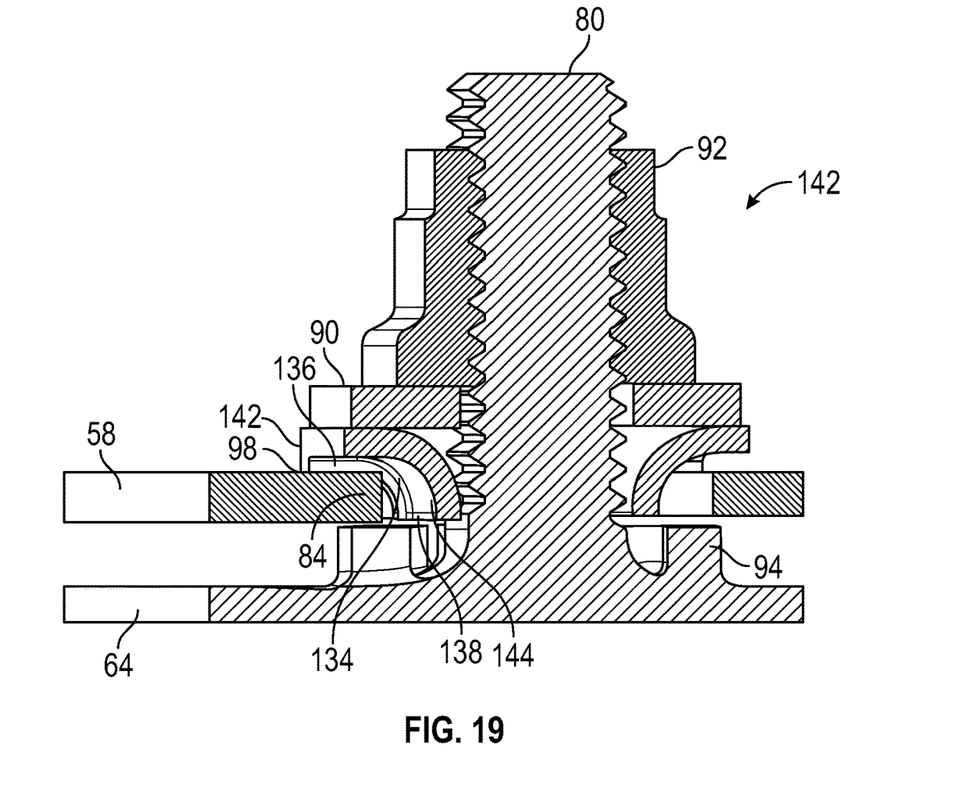
FIG. 19 is another cross-sectional view of an embodiment of an attachment of a combustor liner panel to a combustor shell.

In another embodiment illustrated in FIG. 19, the washer ribs 142 are located at the first washer side 98 and define the passage inlets 136 between the first washer side 98 and the combustor shell 58, and the sleeve passages 134 are similarly defined between a sleeve outer surface 144 and the combustor shell 58 and extend to passage outlets 138. In this embodiment, the sleeve passages 134 allow the cooling flow 70 to flow through the shell stud opening 84 and out of the passage outlets 138 to impinge on the stud 80 and the standoffs 94.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor for a gas turbine engine, comprising:
   a combustor shell having a shell opening therethrough;
   a combustor panel having a stud attached thereto, the stud extending through the shell opening, the stud including a standoff to define an intermediate passage between the combustor shell and the combustor panel;
   a retainer attached to the stud; and
   a washer surrounding the stud and positioned between the retainer and the combustor shell, the washer at least partially defining a cooling flow passage configured to direct a cooling airflow through the shell opening to impinge the cooling flow on at least one of the stud or the standoff;
   wherein the washer includes a plurality of washer arms extending radially inwardly from a circular outer perimeter of the washer, the cooling flow passage defined between adjacent washer arms of the plurality of washer arms.

2. The combustor of claim 1, wherein each washer arm includes a web portion and a relatively circumferentially wide end portion located radially inboard of the web portion.

3. The combustor of claim 1 wherein adjacent washer arms do not contact each other.

4. A washer for a combustor of a gas turbine engine comprising:
   a first washer surface;
   a second washer surface opposite the first washer surface;
   a circular outer perimeter surface extending between the first washer surface and the second washer surface;
   a plurality of washer arms extending radially inwardly from the outer perimeter surface of the washer; and
   a cooling flow passage to direct a cooling airflow therethrough, the cooling flow passage defined between adjacent washer arms of the plurality of washer arms.

5. A gas turbine engine, comprising:
   a turbine section; and
   a combustor configured to combust fuel and direct combustion products to the turbine section, the combustor including:
   a combustor shell having a shell opening therethrough;
   a combustor panel having a stud attached thereto, the stud extending through the shell opening, the stud including a standoff to define an intermediate passage between the combustor shell and the combustor panel;
   a retainer attached to the stud; and
   a washer surrounding the stud and positioned between the retainer and the combustor shell, the washer at least partially defining a cooling flow passage configured to direct a cooling airflow through the shell opening to impinge the cooling flow on at least one of the stud or the standoff;
   wherein the washer includes a plurality of washer arms extending radially inwardly from a circular outer perimeter of the washer, the cooling flow passage defined between adjacent washer arms of the plurality of washer arms.

\* \* \* \* \*